Figure 1:
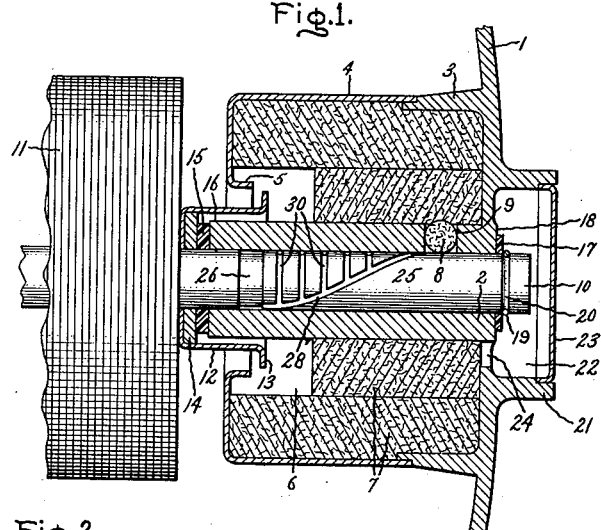

May 27, 1952  L. W. WIGHTMAN  2,598,476
BEARING ASSEMBLY
Filed Jan. 3, 1949

Inventor:
Lawrance W. Wightman,
by  *Prowell P. Mack*
His Attorney.

Patented May 27, 1952

2,598,476

UNITED STATES PATENT OFFICE 2,598,476

BEARING ASSEMBLY

Lawrance W. Wightman, Fort Wayne, Ind., assignor to General Electric Company, a corporation of New York Application January 3, 1949, Serial No. 68,995

6 Claims. (Cl. 308—121)

1

This invention relates to bearing assemblies and more specifically to sleeve bearings wherein the journal surface of the shaft is provided with grooves for pumping lubricant through the bearing.

The utilization of spiral grooves in sleeve type bearings or in the journal surfaces of shafts supported by such bearings for pumping lubricant through the bearing in a predetermined direction is well known in the art. However, the conventional spiral grooving will only pump in the desired direction for one direction of rotation of the shaft. It is desirable in the design of sleeve bearings, particularly of the type utilized in small unit bearing motors, to provide a system of grooving which will pump lubricant along the shaft in one direction regardless of the direction of rotation of the shaft.

An object of this invention is to provide an improved sleeve bearing assembly.

Another object of this invention is to provide an improved sleeve bearing assembly of the type having lubricant pumping grooves formed on the journal surface.

A further object of this invention is to provide an improved sleeve bearing assembly of the type having lubricant pumping grooves on the journal surface wherein lubricant is pumped along the journal surface in one direction regardless of the direction of rotation of the shaft.

Further objects and advantages of this invention will become apparent and the invention will be better understood from the following description referring to the accompanying drawing, and the features of novelty which characterize this invention will be pointed out with particularity in the claims annexed to and forming part of this specification.

In accordance with one aspect of this invention, there is provided a sleeve bearing assembly in which the journal surface of the shaft is provided with an undercut portion extending completely around the shaft. A pair of lubricant pumping grooves extend in opposed spirals along the shaft from the undercut portion and meet to form a substantially V-shaped configuration with the apex thereof remote from the undercut portion. A plurality of peripheral grooves on the journal surface extend between the spiral grooves, and lubricating means such as a wick extending into a lubricant reservoir is arranged to feed lubricant to the journal surface at a point on the side of the apex of the grooves remote from the undercut portion. With this arrangement, lubricant will be pumped along the journal sur-

2 face in the trailing spiral groove from the apex of the spiral grooves toward the undercut portion by the trailing side of the trailing spiral groove regardless of the direction of rotation of the shaft. The provision of the peripheral grooves between the spiral grooves breaks up the trailing edge of the leading groove preventing a build up of pressure which would otherwise pump lubricant back toward the apex in the leading groove and any lubricant which tends to be pumped in that direction is diverted through the peripheral grooves back into the trailing groove where it is again pumped toward the undercut portion.

Figure 2:
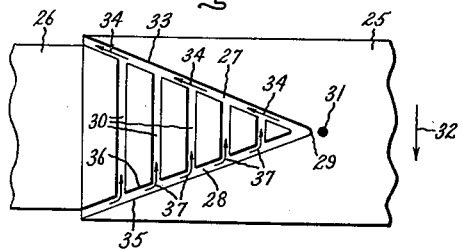
Figure 3:
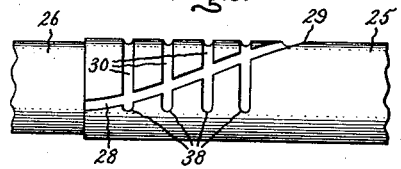
Figure 5:
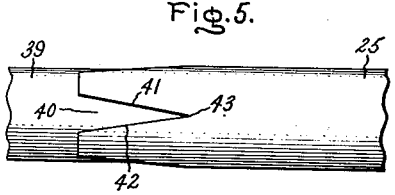
Figure 4:
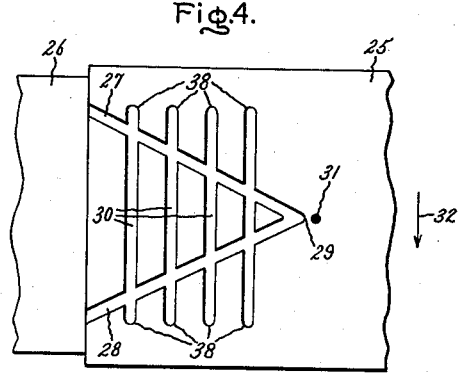
Figure 6:
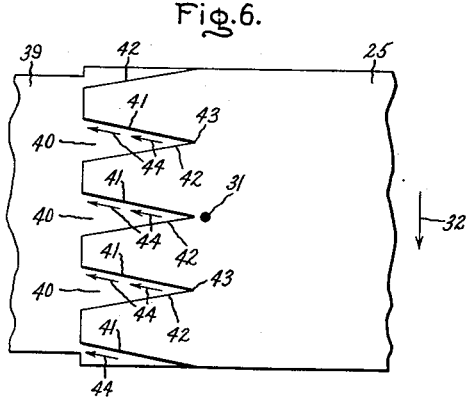

In the drawing, Fig. 1 is a side elevational view, partly in section, of a bearing assembly provided with an embodiment of this invention; Fig. 2 illustrates the groove in the journal surface of the shaft of Fig. 1 with the journal surface shown developed; Fig. 3 illustrates a shaft provided with the grooving principle of Fig. 1, however, with peripheral grooves which are easier to machine than the peripheral grooves of Fig. 1; Fig. 4 is a developed view of the shaft of Fig. 3; Fig. 5 illustrates another embodiment of the unidirectional lubricant pumping grooving of this invention; and Fig. 6 is a developed view of the shaft of Fig. 5.

Referring now to Fig. 1, there is shown a bearing assembly for a small unit bearing dynamoelectric machine provided with an end shield 1 with a sleeve bearing 2 formed integral therewith and extending toward the interior of the machine. The end shield 1 is provided with a cylindrical flanged portion 3 to which a cylindrical cover member 4 is secured. The cover member 4 is provided with a re-entrant opening 5 and forms with the end shield 1 a lubricant reservoir 6. Absorbent packing material 7 is positioned in the lubricant reservoir 6 and feeds lubricant to lubricant feeding means such as a wick 8 which is positioned in a transverse opening 9 in the surface of the bearing 2. A shaft 10 is rotatably supported by the bearing 2 and carries the rotor 11 of the dynamoelectric machine. A cup-shaped member 12 is secured to the shaft 10 abutting the rotor 11 and extends through the re-entrant opening 5 of the cover member 4 so that the flanges 13 extend into the lubricant reservoir 6. A neoprene washer 14 and a moulded resinous washer 15 are positioned between the cup member 12 and the end 16. The end play of the shaft 10 is adjusted by a moulded resinous washer 17 abutting the other end 18 of the bearing 2, the washer 17 being held in place by a snap ring 19 positioned in a peripheral groove 20 formed in the shaft 10. A cylindrical flanged portion 21 forms an end cavity 22 which is closed by a cover plate 23. An oil return opening 24 is provided in the end shield 1 between the end cavity 22 and the lubricant reservoir 6.

In order to provide for the pumping of lubricant, which is fed to the journal surface 25 of the shaft 10 by the wick 8, along the journal surface toward the end 16 of the bearing, the arrangement now to be described is provided. The journal surface 25 has an undercut portion 26 formed thereon extending completely around the journal surface. A pair of grooves 27 and 28 extend in opposed spirals along the journal surface 25. These grooves 27 and 28 communicate with the undercut portion 26 and meet to form an apex 29 remote from the undercut portion 26. Thus, the spiral grooves 27 and 28 present a V-shaped configuration along the axis of the shaft 10. A plurality of peripheral grooves 30 are formed on the journal surface 25 extending between and communicating with the spiral grooves 27 and 28.

Referring now specifically to Fig. 2, it will be seen that the lubricant is fed to the journal surface 25 by the wick 8 at the point designated as 31. With the shaft rotating in the direction shown by the arrow 32, the lubricant will be pumped along the trailing spiral groove 27 by the trailing edge 33 thereof toward the undercut portion 26 as shown by the arrows 34. It will also be readily seen that the leading edge 35 of the leading spiral groove 28 is not available for pumping when the direction of rotation is as shown by the arrow 32 and the trailing edge 36 of the leading spiral groove 28 is broken up by the peripheral grooves 30. Therefore, the provision of the peripheral grooves 30 prevents the building up of pressure by the pumping action of the trailing edge 36 of the leading spiral groove 28 which would ordinarily tend to pump lubricant along the groove 28 toward the apex 29. The pumping action of the trailing edge 33 of the trailing groove 27 will build up a lubricant pressure in the undercut portion 26 which will tend to force some lubricant back into the leading groove 28. However, any lubricant so forced into the leading groove 28 will be diverted into the peripheral grooves 30 as shown by the arrows 37. This lubricant will traverse the peripheral grooves 30 and rejoin the lubricant being pumped along the trailing groove 27 to further increase the pressure. Thus, it will be seen that a relatively large amount of lubricant will be pumped along the trailing groove 27 from the apex 29 into the undercut portion 26 while a relatively small amount of lubricant will be drawn out of the undercut portion into the leading groove 28 and such lubricant as is drawn into the leading groove 28 will be diverted through the peripheral grooves 30 back into the trailing groove 27 to further increase the pressure which is normally built up by the trailing edge 33 to force the lubricant along the trailing groove 27. Since the lubricant pressure accumulated in the undercut portion 26 will not force any appreciable amount of lubricant along the leading groove 28 toward the apex 29, any excess lubricant will be forced out of the bearing and will be thrown back into the lubricant reservoir 6 by the lubricant throwing flange 13 of the cup member 12. Any lubricant which travels in the opposite direction from the wick 8 is thrown into the end cavity 22 where it drains back into the lubricant reservoir 6 through opening 24. It will now be readily apparent that since the arrangement of the spiral grooves 27 and 28 and peripheral grooves 30 is symmetrical, lubricant will be pumped in the same direction, i. e. from the apex 29 to the undercut portion 26, regardless of the direction of rotation. Therefore, when the direction of rotation of the shaft 10 is opposite from that shown by the arrow 32, lubricant will be pumped by the edge 35 along the groove 28 into the undercut portion 26.

Referring now to Figs. 3 and 4, there is shown an arrangement identical in principle with that shown in Figs. 1 and 2. However, the peripheral grooves 30 are provided with extensions 38 so that the shaft can be more readily manufactured. Here, the spiral grooves 27 and 28 can be rolled on the shaft and the peripheral grooves 30 since they are, by virtue of the extensions 38, all of the same length, can be cut with a formed cutter or rolled simultaneously.

Referring now to Figs. 5 and 6, there is shown another form of the improved unidirectional lubricant pumping grooving of this invention. Here, with like parts being indicated by like reference numerals, the shaft 10 is provided with a journal surface 25 and an undercut portion with a main section 39 and a plurality of extensions 40. The extensions 40 of the undercut portion are each provided with a pair of side walls 41 and 42 which extend in opposed spirals along the journal surface 25 and meet to form an apex 43. The side walls 41 and 42, thus, present a substantially V-shaped configuration along the axis of the shaft with the apex thereof remote from the main section 39 of the undercut portion. Here, with the lubricant being introduced, as shown in Fig. 1, by the wick 8 at a point indicated as 31 and with the direction of rotation of the shaft being as shown by the arrow 32, lubricant will be pumped from the apexes 43 toward the main section 39 of the undercut portion by the trailing sides 41 of the undercut portion extensions 40 as shown by the arrows 44. Thus, lubricant is pumped into the main section 39 of the undercut portion, however, the leading sides 42 of the undercut portion extensions 40 are not available for pumping and there is no tendency for the lubricant to be pumped back toward the apexes 43. Thus, it will be readily apparent that the functioning of the embodiment of Figs. 5 and 6 is identical with that of the embodiment of Figs. 1 through 4 and the lubricant will be pumped from the apexes 43 into the main section 39 of the undercut portion whether the rotation is as shown by the arrow 32 or reversed.

It will now be readily apparent that this invention provides an improved bearing assembly which by virtue of the substantially V-shaped configuration of the grove or undercut portions on the journal surface of the shaft, will pump lubricant in the same direction along the journal surface regardless of the direction of rotation of the shaft.

While I have illustrated and described a particular embodiment of this invention, modifications thereof will occur to those skilled in the art. I desire it to be understod, therefore, that this invention is not to be limited to the particular arrangement disclosed, and I intend in the appended claims to cover all modifications which do not depart from the spirit and scope of this invention.

What I claim as new and desire to secure by Letters Patent of the United States is:

1. In combination, a shaft, a bearing for rotatably supporting said shaft, and means for feeding lubricant to the journal surface of said shaft, said journal surface having a pair of lubricant guiding means formed thereon presenting a substantially V-shaped configuration along the axis of said shaft and at least one peripheral undercut portion connecting said lubricant guiding means and only partially encircling said shaft whereby lubricant fed to said journal surface by said lubricant feeding means is pumped along said journal surface in the same direction by the trailing one of said lubricant guiding means regardless of the direction of rotation of said shaft.

2. In combination, a shaft, a bearing for rotatably supporting said shaft, and means for feeding lubricant to the journal surface of said shaft, said journal surface having a substantially V-shaped undercut portion formed thereon, said undercut portion having two side walls respectively extending along said shaft whereby lubricant fed to said journal surface by said lubricant feeding means is pumped along said journal surface in the same direction by the trailing one of said side walls of said undercut portion regardless of the direction of rotation of said shaft.

3. In combination, a shaft, a bearing for rotatably supporting said shaft, and means for feeding lubricant to the journal surface of said shaft, said journal surface having an undercut portion formed thereon with a main section extending completely around said journal surface and a V-shaped section having two side walls respectively extending in opposed spirals along said shaft with the apex thereof remote from said main section of said undercut portion whereby the lubricant fed to said journal surface by said lubricant feeding means is pumped along said journal surface in the same direction by the trailing side wall of said undercut portion extension regardless of the direction of rotation of said shaft.

4. In combination, a shaft, a bearing for rotatably supporting said shaft, and means for feeding lubricant to the journal surface of said shaft, said journal surface having two grooves respectively extending in opposed spirals along said shaft and meeting to present a substantially V-shaped configuration, said journal surface having a plurality of peripheral grooves formed thereon extending between said spiral grooves and only partially encircling said shaft whereby lubricant fed to said journal surface by said lubricant feeding means is pumped along said journal surface in the same direction by the trailing one of said side of the trailing spiral grooves regardless of the direction of rotation of said shaft.

5. In combination, a shaft, a bearing for rotatably supporting said shaft, and means for feeding lubricant to the journal surface of said shaft, said journal surface having an undercut portion extending completely around said shaft and two grooves extending in opposed spirals along said shaft and meeting to form a substantially V-shaped configuration along the axis of said shaft with the end of said grooves remote from the apex thereof communicating with said undercut portion extending around the shaft, said journal surface having a plurality of peripheral grooves extending between said spiral grooves and only partially encircling said shaft whereby lubricant fed to said journal surface by said lubricant feeding means is pumped along said journal surface in the same direction by the trailing side of the trailing one of said spiral grooves regardless of the direction of rotation of said shaft.

6. In combination, a shaft, a bearing for rotatably supporting said shaft, and means for feeding lubricant to the journal surface of said shaft, said journal surface having an undercut portion with a main section extending completely around said journal surface and forming a shoulder therewith, said shoulder being interrupted by a plurality of V-shaped extensions of said main undercut portion each having two side walls respectively extending along said shaft with the apex thereof remote from said undercut portion main section whereby lubricant fed to said journal surface by said lubricant feeding means is pumped along said journal surface in the same direction by said side walls of said undercut portion extensions which are trailing regardless of the direction of rotation of said shaft, said lubricant feeding means being positioned on the side of the apexes of said undercut portion extensions remote from said main section of said undercut portion.

LAWRANCE W. WIGHTMAN.

REFERENCES CITED

The following references are of record in the file of this patent:

UNITED STATES PATENTS

| Number | Name | Date |
|---|---|---|
| 566,200 | Loucks | Aug. 18, 1896 |
| 898,463 | Gustafson | Sept. 15, 1908 |
| 1,463,731 | Swan | July 31, 1923 |
| 1,762,373 | Wright | June 10, 1930 |